April 11, 1961 W. E. MOODY 2,978,858
YIELDABLE DRIVE CONNECTION FOR A ROTARY LAWN MOWER
Filed July 8, 1958

INVENTOR.
Warren E. Moody.
By
F. J. Whitney
Attorney.

United States Patent Office 2,978,858
Patented Apr. 11, 1961

2,978,858

YIELDABLE DRIVE CONNECTION FOR A ROTARY LAWN MOWER

Warren E. Moody, Rte. 7, P.O. Box 173, Greensboro, N.C.

Filed July 8, 1958, Ser. No. 747,273

2 Claims. (Cl. 56—295)

This invention relates to a yieldable drive connection between two relatively movable parts, and more particularly to the use of such a connection between the drive shaft of a motor operated rotary lawn mower and the cutting blade.

It has been found that in the normal course of lawn mowing and weed and grass cutting by mowers of the motor operated rotary blade type, that despite great care by the operator, it often happens that the whirling blade will strike an unseen and unyielding obstruction, as for example, a stump, rock, iron stake or other rigid object, with the result that the cutting blide may be bent, broken or otherwise damaged. Also, the sudden impact of the blade against such an object may result in putting an undue strain on the drive shaft and the motor, causing damage to these and other parts of the mower. It is the principal object of this invention to provide a simple yet effective drive means between the rotary cutting blade and the drive shaft of a motor operated lawn mower that will automatically yield when the whirling blade strikes an unyielding obstruction of the type mentioned above, thus preventing breakage and other damage to the blade and its driving mechanism.

A further object of this invention is to provide an overload release mechanism or clutch between a drive shaft and a rotary blade member in which friction is reduced to a minimum, and in which the holding means normally has sufficient force to keep the cutting blade from being released but will instantly yield when the driving connection is overloaded.

A still further object of this invention is to provide an overload release mechanism in which the interengaging parts will automatically and instantly reengage when the overload is removed.

Another object of the invention is to provide an automatic overload release mechanism which is simple in construction and operation, economical to produce and maintain, and yet effective to perform its function.

Other objects will appear hereinafter throughout the specification.

Referring now to the drawing.

Figure 1:
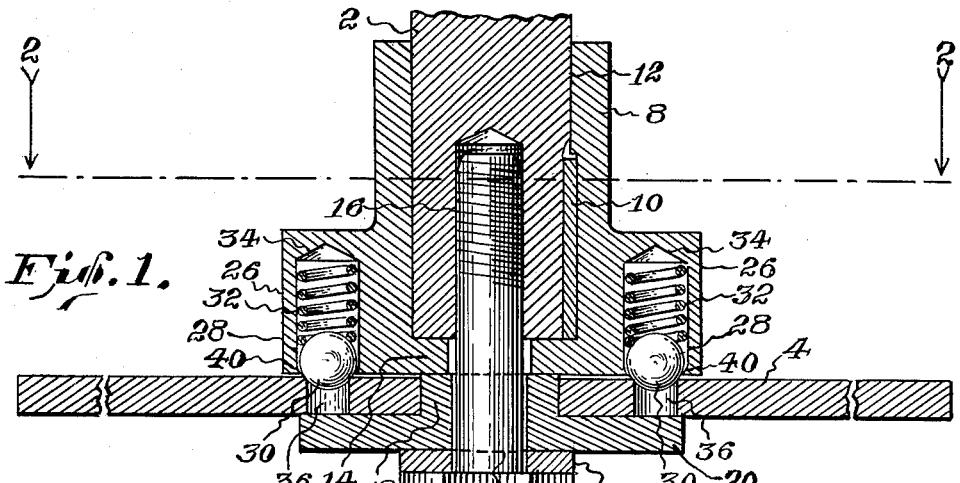
Figure 1 is a central vertical section through the yieldable drive connection, a part of the blade and the drive shaft being broken away and the blade being shown in longitudinal section.
Figure 2:
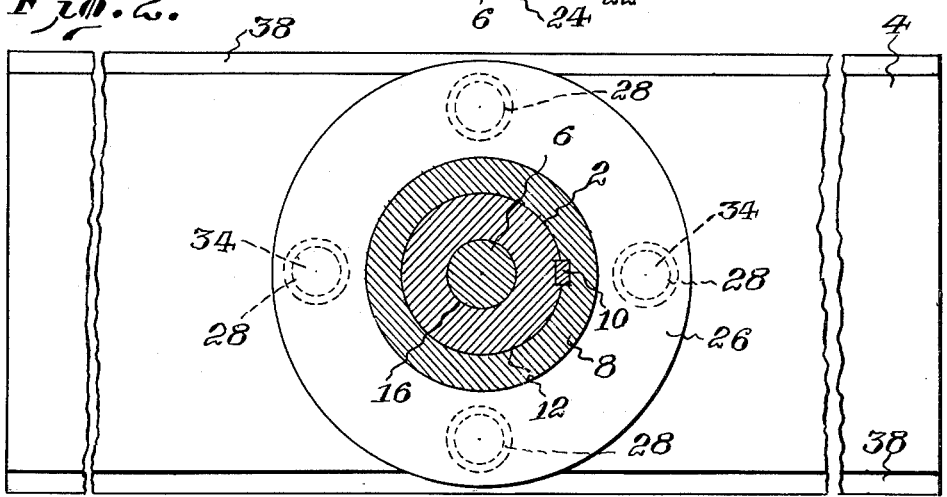
Figure 2 is a horizontal section taken on the line 2—2 of Figure 1.

In the drawing, 2 indicates the drive shaft of a rotary power mower in which 4 represents the cutting blade detachably connected to the drive shaft 2 by the bolt 6 threaded into the lower end of the drive shaft as clearly shown in Figure 1. Arranged on the lower end of the drive shaft 2 and overlying the central portion of the blade 4 is a hub or adapter 8 which is held against rotation on the drive shaft 2 by the key or spline 10 which engages in confronting grooves in the shaft 2 and the central opening 12 in the hub, as clearly shown in Figures 1 and 2. As indicated in Figures 1 and 2, the hub 8 is telescoped over the lower end of the drive shaft 2 and is provided with an annular inwardly extending flange 14 at its lower end which partially closes the lower end of the central opening 12 and has its upper face engaging the lower end of the shaft 2 when the bolt 6 is threaded into the opening 16 in the drive shaft, and its lower face engaging the upper face of an annular flange 18 on the washer 20. The washer 20 is clamped between flange 14 on the hub and a second washer 22 mounted between the washer 20 and the head 24 of the bolt 6. The washer 22 is preferably of the locking type so that when the bolt 6 is screwed home the hub and the two washers will be rigidly bound together. As shown in Figure 1, the openings through the flange 14 and the washers are slightly larger than the diameter of the bolt to prevent binding and provide for ease of assembly.

As clearly indicated in the drawing, the lower end of the hub is enlarged to form an outwardly extending annular flange 26 provided with a plurality of spaced parallel openings 28 extending inwardly from its lower face. The openings 28 terminate short of the upper side of the flange 26, and are arranged in an annular zone around the shaft and in equally spaced apart arrangement in the zone and to the center of the shaft and the hub. Four of the openings 28 are shown in the drawing, but it will be understood that any suitable number of such openings may be provided as desired.

Each opening 28 has a ball 30 therein at its lower end, and this ball is urged downwardly by a coil spring 32 housed in the opening between its closed upper end 34 and the ball 30. As clearly shown in Figures 1 and 2, the blade 4 has a plurality of apertures 36 equal in number to and spaced in the same manner as the openings 28 in the hub so that all of the balls will be engaged in the apertures when the blade is in its normal cutting position. In order to allow for the proper operation of the balls, the thickness of the blade is slightly less than the height of the flange 18, as clearly shown in Figure 1. While coil springs have been shown to urge the balls downwardly into the apertures 36, it will be understood that any other suitable resilient means could be used. Due to the shape of the balls, friction is reduced to a minimum, since as the balls ride out of and into the apertures 36 new ball surfaces are presented to the upper edges of the apertures after each change of position of the balls. In order to prevent undue wear on the balls, the upper corners of the apertures 36 in the blade are rounded off so as to present smooth surfaces for the balls to ride on.

While the apertures 36 have been shown as extending entirely through the blade, it will be understood that they may be closed at their lower ends, if desired.

Figure 3:
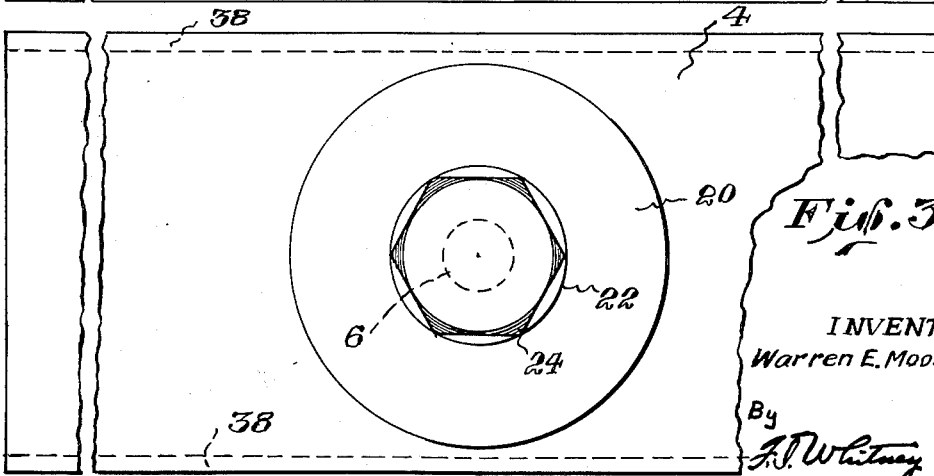
Figure 3 is a bottom plan view of the drive connection of Figures 1 and 2.

As indicated in Figures 2 and 3, the longitudinal edges of the blade 4 are sharpened to provide cutting edges 38 shown in full lines in Figure 2 and in dotted lines in Figure 3.

After assembly of the balls and the springs, the openings 28 are crimped inwardly at 40 to retain the balls and prevent their loss when the blade is removed for sharpening or other service.

From the above description, it will be apparent that when the balls 30 are held in the upper ends of the apertures 36 in the blade, the latter will be releasably held in a position to rotate with the shaft 2 which is operatively connected to a motor or other source of power (not shown). When, however, the blade strikes an unyielding obstruction, the balls will be moved upwardly to compress the springs sufficiently to allow the balls to move out of the apertures 36 and onto the flat upper surface of the blade, thus releasing the blade so that it can remain stationary as the drive shaft keeps on rotating until the power can be shut off. As soon as the obstruction is removed, the balls will automatically seat in the apertures and the mowing operation can be resumed. The balls should seat in the apertures to just such a depth and the springs should be of just such a strength as to normally hold the balls in their engaged position but at the same time allow ready release of the balls when the blade is overloaded. It will be apparent from the drawing that the amount each ball projects into an aperture in the blade must be less than its radius in order to perform its intended function. While a key has been shown as connecting the shaft and the blade, it will be understood that any other suitable means, such as a set screw, for example, could be used, if desired.

The above description and drawing disclose one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. A driving unit for a rotary lawn mower, comprising a substantially vertically disposed drive shaft, a hub on the lower end of said shaft, said hub having a central opening, the lower end of said shaft being rigidly secured in said central opening, said hub being provided with a plurality of openings terminating at its lower face, said plurality of openings being arranged in an annular zone around said shaft and being disposed equal distances apart in said zone and being equally spaced from the axis of said shaft, a rotary cutting blade, bolt means removably securing said blade to said shaft, said blade being provided with a central opening, a washer around said bolt means, said washer having an annular flange extending upwardly through said opening in said blade and surrounding said bolt means, an interior annular flange on said hub partially closing the lower end of said opening in said hub, the upper side of said interior annular flange limiting downward movement of said shaft in said hub, and the lower side of said interior flange limiting upward movement of said annular flange on said washer as the bolt means is tightened to draw the washer into engagement with said hub, a ball in each of said plurality of openings, a spring in each of said plurality of openings above said ball to normally urge the ball beyond the lower face of said hub, said blade being provided with a plurality of spaced apertures, said apertures being annularly arranged around said central opening in said blade and being spaced from each other and from the axis of said shaft in the same manner as said plurality of openings in said hub, the diameters of said balls being greater than the cross section of said apertures so that said balls will normally be seated in the upper ends of said apertures, said balls acting under force of said springs to normally cause said blade to rotate with said shaft but on overloading of said blade the balls will ride out of their seats in said apertures against the force of said springs to release the blade and permit the shaft to rotate with relation to the blade thus preventing damage to the mower.

2. A yieldable drive connection, comprising a driving member, a hub on the outer end of said driving member, said hub having a central opening, said outer end of said driving member being rigidly secured in said central opening, said hub being provided with a plurality of openings terminating at its outer face, said plurality of openings being arranged in an annular zone around said driving member and being disposed equal distances apart in said zone and being equally spaced from the axis of said driving member, a rotary driven member, bolt means removably securing said driven member to said driving member, said driven member being provided with a central opening, a washer around said bolt means, said washer having an annular flange extending through said central opening in said driven member and surrounding said bolt means, the inner end of said flange abutting the adjacent end of said hub, a ball in each of said plurality of openings, a spring behind each ball urging it toward said driven member, said driven member being provided with a plurality of spaced apertures, said apertures being annularly arranged around said central opening in said driven member and being spaced from each other and from the axis of said driving member in the same manner as said plurality of openings in said hub, the diameters of said balls being greater than the cross section of said apertures so that said balls will normally be seated in the adjacent ends of said apertures, said balls acting under the force of said springs to normally cause said driven member to rotate with said driving member but on overloading of said driven member the balls will ride out of their seats in said apertures against the force of said springs to release the driven member and permit the driving member to rotate with relation to the driven member thus preventing damage to the said connection.

References Cited in the file of this patent

UNITED STATES PATENTS

| | | |
|---|---|---|
| 865,486 | Gannon | Sept. 10, 1907 |
| 1,211,515 | Winter | Jan. 9, 1917 |
| 1,672,964 | Stull | June 12, 1928 |
| 2,721,438 | O'Maley | Oct. 25, 1955 |
| 2,875,569 | Sauer | Mar. 3, 1959 |

FOREIGN PATENTS

| | | |
|---|---|---|
| 164,542 | Australia | Aug. 10, 1955 |